United States Patent Office 3,449,372
Patented June 10, 1969

3,449,372
PROCESS FOR THE PRODUCTION
OF COUMARINS
Erich Marcus, Charleston, and John K. Chan, South
Charleston, W. Va., assignors to Union Carbide Corporation, a corporation of New York
No Drawing. Filed Feb. 9, 1967, Ser. No. 614,812
Int. Cl. C07d 7/28
U.S. Cl. 260—343.2       7 Claims

ABSTRACT OF THE DISCLOSURE

Coumarins are produced by reacting diketene in the presence of a high concentration of certain tertiary amines. Among the novel coumarins produced by this process are 3,6-diacetyl-4,7-dimethyl-5-hydroxycoumarin and 3,8-diacetyl-4,7-dimethyl-5-hydroxycoumarin. The novel compounds are useful as indicators in acid-base titrations.

---

This invention relates to a novel process for the production of coumarins and derivatives thereof and to the novel compounds produced thereby.

A valuable commercial compound is diketene, which is used to produce many products for the chemical industry. One important product produced from diketene is dehydroacetic acid, which is obtained by the dimerization of diketene. This dimerization is carried out in an inert solvent containing a catalytic amount of a tertiary amine. The reaction proceeds as follows:

(2)
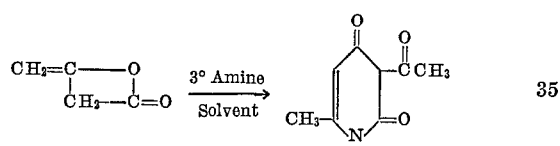

This is a well known and established process and in view thereof it was therefore completely unexpected and unobvious to find that one could produce coumarine by the process of the instant invention.

It has now been found that coumarins are readily produced from diketene without the production of dehydroacetic acid when the diketene is reacted in the presence of a large amount of certain tertiary amines. The reaction can be carried out in the absence of any solvent by the addition of the diketene directly to the tertiary amine. It can also be carried out in the presence of an inert solvent, provided that the tertiary amine represents at least about 15 percent by weight, preferably 20 percent, of the mixture of the tertiary amine and the solvent and provided that the tertiary amine is present in an amount of at least 0.05 mole of tertiary amine per mole of diketene, preferably at least 0.1 mole. Among the inert solvents that can be used are benzene, toluene, xylene, pentane, hexane, heptane, decane, cyclohexane, cyclopentane, methylcyclopentane, and others known to the average skilled scientist.

The reaction of diketene in the presence of the large amount of tertiary amine takes an unexpectedly different course. The process of this invention does not produce dehydroacetic acid; rather it produces coumarin compounds. This was completely unobvious and unexpected from the prior knowledge and teachings.

It has been postulated that the coumarins are produced by the following reaction sequence:

(4)
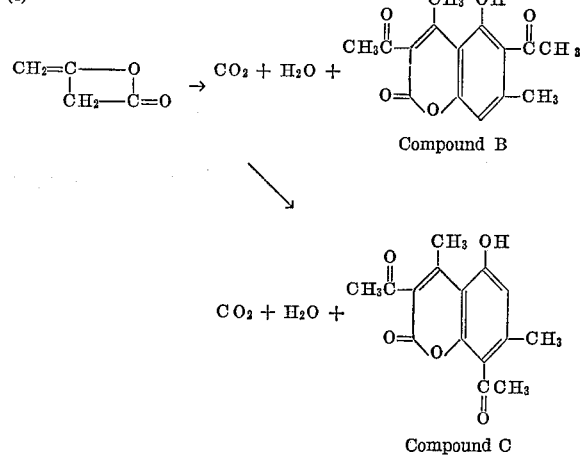

Another coumarin derivative, a benzodipyran, is produced by the following reaction sequence:

(5)
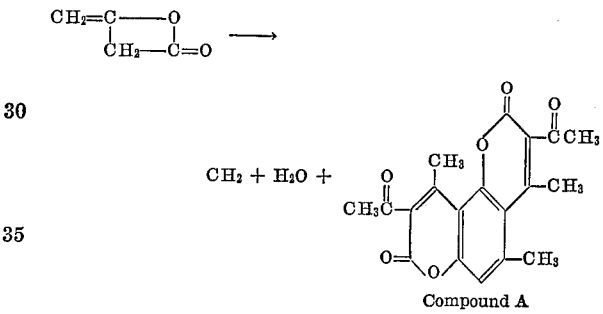

While these reaction sequences appear to be correct, the applicants do not wish to be bound to the theories set forth since the theory does not control the patentability of an invention.

The tertiary amines which can be used are those which are aliphatic in nature and are preferably the tertiary alkylamines that are liquid at the reaction temperature. These tertiary alkylamines can contain from 1 to about 20, preferably 2 to 10, carbon atoms in each alkyl group thereof and include, for example, trimethylamine, triethylamine, tri-n-butylamine, triisoamylamine, tri(2-ethylhexyl)amine, diethylmethylamine, and the like. Also suitable are the cyclic amines such as N-methylmorpholine, N-ethylpiperidine, N,N'-dimethylpiperazine, and the like; as well as the aralkylamines in which the amine nitrogen atom is attached to three aliphatic carbon atoms such as N,N-dimethylbenzylamine, N,N-diethylphenethylamine, N,N-di-n-butyl-p-methylbenzylamine, and the like. Certain weakly basic amines, for example the pyridines and arylamines are not recommended because the reaction of diketene in pyridine and in N,N-dimethylamine produces mainly dehydroacetic acid.

In the process of this invention the diketene is preferably added to the tertiary amine at a temperature of from about 0° C., or less, to about the boiling point of the tertiary amine or tertiary amine plus solvent mixture. The temperature is preferably from about 0° C. to about 100° C., and most preferably from about 20° C. to about 60° C. The reaction can be carried out at atmospheric superatmospheric pressure; pressure not being a critical variable.

The diketene is added to the tertiary amine over a period of time and the reaction mixture is then maintained at the selected temperature for an additional period of time. These periods will vary depending on the volumes concerned; however, in the laboratory it was found that when the reaction is carried out at from about 20° C. to about 60° C., a time of about 1 to 4 hours for the addition of the diketene to the tertiary amine and about 1 to 8 hours thereafter at the selected temperature are adequate.

The coumarins and coumarin derivatives produced by this invention are recovered by a series of fractional crystallizations from the reaction mixture.

The compounds A, B and C find use as indicators in acid-base titrations. The following examples further serve to illustrate this invention.

Example 1

Diketene (84 g., 1.0 mole) was slowly added in a dropwise manner into triethylamine (101 g., 1.0 mole) with stirring at 25–30° C. over a period of about 2 hours. The reaction was exothermic and a large volume of carbon dioxide was given off. After the addition was complete the mixture was stirred at room temperature for 1 hour longer and then at 40–45° C. for 1.5 hours until carbon dioxide evolution stopped. On standing, two layers formed. The lower layer of the reaction mixture was separated and diluted with 180 ml. of methanol. A solid precipitated, was filtered, and washed with methanol. The solid weighed 22 g., M.P. 226–229° C. Recrystallization from cholorform gave a white solid, M.P. 234–236° C. This was identified by spectral and elemental analyses as compound A, 3,9-diacetyl-4,5,10-trimethyl-2H,8H-benzo[1,2-b:3,4-b']dipyran-2,8-dione. The yield was 32% based on diketene. The NMR spectrum of compound A in deuterated chloroform showed sharp singlets at 2.54 p.p.m. (3H), 2.57 p.p.m. (6H), 2.74 p.p.m. (3H), a slightly broadened singlet at 2.80 p.p.m. (3H) for methyl and acetyl groups, and a broad singlet at 7.12 p.p.m. (1H, aromatic). The infrared spectrum (KBr pellet) showed very strong absorption at 5.83 and 5.88 microns (C=O); it also contained peaks at 6.19, 6.24, 6.38, 6.97, 7.08, 7.21, 7.40, 8.12, 8.90, 9.58, 10.47, 11.30, 12.70, and 13.10 microns.

*Analysis.*—Calcd. for $C_{19}H_{16}O_6$: C, 67.05; H, 4.75; M.W., 340.3. Found: C, 66.91; H, 4.80; M.W. (largest parent peak by mass spectroscopy), 340.

The upper layer of the reaction mixture was combined with the methanol filtrate and the methanol wash. The mixture was evaporated under reduced pressure leaving a syrupy residue (51.6 g.). The residue was slurried with chloroform and filtered to give 9.1 g. of a yellow solid, M.P. 194–197° C. Recrystallization from chloroform gave the pale yellow compound B, 3,6-diacetyl-4,7-dimethyl-5-hydroxycoumarin, M.P. 199–201° C. The yield was 13%. The NMR spectrum of compound B in deuterated chloroform showed a slightly broadened signlet at 2.66 p.p.m. (3H, 7-methyl group), sharp singlets at 2.52, 2.60, 2.70 p.p.m. (9H, methyl and acetyl groups), a broad singlet at 6.62 p.p.m. (1H, aromatic), and a sharp singlet at 14.74 p.p.m. (1H, chelated hydroxyl group). The IR spectrum (KBr pellet) showed broad weak absorption at 3.7 to 4.4 microns (OH, chelated), strong absorption at 5.83 and 5.93 (C=O, conjugated lactone and conjugated acetyl), and 6.23 microns (C=O, chelated); it also contained peaks at 6.45, 6.72, 7.05, 7.21, 7.62, 7.91, 8.19, 8.46, 8.95, 9.24, 9.61, 9.70, 10.43, 11.39, 12.62, 12.94 and 14.07 microns.

*Analysis.*—Calcd. for $C_{15}H_{14}O_5$: C, 65.69; H, 5.15; M.W., 274.3. Found: C, 65.41; H, 5.21; M.W. (largest parent peak by mass spectroscopy), 274.

On further evaporation of the chloroform filtrate, 9 g. of a brown solid was obtained, M.P. 245–255° C. Recrystallization from methanol gave a white solid, M.P. 260–262° C. This compound was identified as compound C, 3,8-diacetyl-4,7-dimethyl-5-hydroxycoumarin. The yield was 13%. The NMR spectrum of compound C in deuterated acetone exhibited a slightly broadened singlet at 2.25 p.p.m. (3H, 7-methyl group) sharp singlets at 2.45, 2.53, 2.55 p.p.m. (9H, methyl and acetyl groups), and a broad singlet at 6.72 p.p.m. (1H in 6-position). The expected broad peak corresponding to the hydroxyl group of this very insoluble compound could not be seen, probably due to exchange with the solvent. The IR spectrum (KBr pellet) showed very strong absorption at 3.08 (OH), 5.92 (C—O, conjugated lactone), and 6.01 microns (C=O, conjugated acetyl); it also contained peaks at 6.18, 6.30, 6.66, 6.93, 7.33, 7.95, 8.38, 8.95, 9.11, 11.65, 12.71 and 13.04 microns. A $5.83 \times 10^{-4}$ M solution in deuterated chloroform showed the presence of free OH at 2.810 microns, max. 116.5.

*Analysis.*—Calcd. for $C_{15}H_{14}O_5$: C, 65.69; H, 5.15; M.W., 274.3. Found: C, 65.84; H, 5.41; M.W. (largest parent peak by mass spectroscopy), 274.

Example 2

In a manner similar to that described in Example 1, 84 grams of diketene was added to a mixture of 20 grams of triethylamine in 80 grams of toluene. At the end of the reaction a solid was present; this was filtered and dried; weight 23 grams. The solid was suspended in 150 ml. of chloroform, heated to the boil and filtered. The insoluble crystals weighed 16 grams and melted at 232–235° C. A mixed melting point with known compound A showed no depression, establishing that this fraction was 3,9-diacetyl-4,5,10-trimethyl-2H,8H-benzo[1,2-b:3,4-b']dipyran-2,8-dione.

The original reaction liquor was evaporated to a 56 gram residue. This was diluted with 100 ml. of methanol and let stand for 2 hours. The precipitate which formed was filtered and dried; weight was 3.1 grams; melting point of the crude product was 190–193° C. A mixed melting point with known compound B established that it was 3,6-diacetyl-4,7-dimethyl-5-hydroxycoumarin.

The filtrate from which compound B was obtained was evaporated under reduced pressure and 6 grams of solid was recovered. This was recrystallized from methanol and the purified crystals melted at 254–258° C. They were identified, by mixed melting point with compound C, as 3,8-diacetyl-4,7-dimethyl-5-hydroxycoumarin.

Example 3

In a manner similar to that described in Example 1, 43 grams of diketene was slowly added to 50 grams of N-methylpiperidine. A solid was filtered, slurried in 100 ml. of toluene and filtered to give 26.4 grams of crude 3,9 - diacetyl - 4,5,10 - trimethyl - 2H,8H - benzo [1,2-b:3,4-b']dipyran-2,8-dione. Upon recrystallization from chloroform it melted at 232–234° C.

The original mother liquor was concentrated under reduced pressure and then diluted with 50 ml. of methanol. A solid precipitate formed after standing for several hours; this was filtered off and weighed 6 grams. The solid was suspended in methanol, heated to a boil and filtered hot. The crystals recovered weighed 3 grams and melted at 193–196° C.; they were identified by mixed melting point as 3,6-diacetyl-4,7-dimethyl-5-hydroxycoumarin. The methanol filtrate was cooled and 1.5 grams of crude 3,8-diacetyl-4,7-dimethyl-5-hydroxycoumarin was obtained.

Example 4

In a manner similar to that described in Example 1, 43 grams of diketene was slowly added to 65 grams of N,N-dimethylbenzylamine. At the end of the reaction the mixture was filtered and the crystals were washed with 30 ml. of methanol. The crystals were recrystallized from chloroform and melted at 230–232° C.; they were identified as 3,9-diacetyl-4,5,10-trimethyl-2H,8H-benzo[1,2-b:3,4-b']dipyran-2,8-dione.

The combined amine filtrate and methanol wash was evaporated under reduced pressure. A small amount of 3,6-diacetyl-4,7-dimethyl-5-hydroxycoumarin was recovered together with dehydoracetic acid.

For comparative purposes, when trimethylamine was present in a minor catalytic amount, a yield of 68 percent of dihydroacetic acid and 1.5 percent of compound C was obtained. In this experiment 150 ml. of trimethylamine solution (prepared by dissolving 10 g. of trimethylamine in 200 ml. of toluene) was placed in the reaction flask with 1000 ml. of toluene. The mixture was stirred and maintained at 15–24° C., while 2000 g. of diketene solution (50% by weight in acetone) was added over a period of about 2 hours. Stirring was continued for 1 hour after the addition of diketene was complete. The mixture was cooled to −8° C. and filtered. The solid was collected and washed with 1700 ml. of chilled toluene and the toluene wash was allowed to stand for a few hours at room temperature. The washed solid product, dehydroacetic acid, after drying, weighed 683 g. (68%), M.P. 108.5–110° C. A solid precipitated from the toluene wash on standing for several hours and it was filtered off. The weight obtained was 4 g., M.P. 252–256° C. This solid was found to be compound C. The original mother liquor was evaporated in vacuo and the remaining solid was extracted twice with acetone. The insoluble material was separated weighing 11 g., M.P. 249–252° C. Recrystallization from methanol gave a fluffy white solid, M.P. 262–264° C. The total yield of compound C was 15 g. (1.8% yield).

About 1.2 mg. of compound A was weighed out on an analytical balance and transferred to a 125 ml. Erlenmeyer flask. Methanol (10 ml.) was added and the flask was swirled to effect solution. An aqueous solution of 0.5 N NaOH was pipetted in (25 ml.), and the mixture was titrated with standard 0.5 N HCl until the end point was reached; a color change occurred from yellow to colorless.

Wt. of compounds A _____g__ 0.0012
N of HCl _____ 0.5005
Vol. of aq. NaOH _____ml__ 25
Vol. of HCl used _____ml__ 25.1

$$N_{NaOH} = \frac{0.5005 \times 25.1}{25} = 0.5025$$

Reported $N_{NaOH}=0.5012$.

USE OF COMPOUND B AS INDICATOR

Procedure: Same as compound A.

Wt. of compound B _____g__ 0.0015
Vol. of NaOH _____ml__ 25
Vol. of HCl used _____ml__ 25.05
N of HCl _____ 0.5005

$$N_{NaOH} = \frac{0.5005 \times 25.05}{25} = 0.5012$$

Reported $N_{NaOH}=0.5012$.

USE OF COMPOUND C AS INDICATOR

Procedure: Same as compound A.

Wt. of compound C _____g__ 0.0011
Vol. of NaOH _____ml__ 24
Vol. of HCl _____ml__ 24
Normality of HCl _____ 0.5005

$$N_{NaOH} = \frac{0.5005 \times 25}{25} = 0.5005$$

Reported normality=0.5012.

The titrations can also be carried out by dissolving the indicator (compound A, B, or C) in acid, and then titrating the solution with a standard base solution to the end point.

We have also found that compounds B and C can be produced by the reaction of diketene with heptanetrione-2,4,6 in the presence of a tertiary amine. In this procedure, diketene (8.4 g.) was added dropwise over a period of 1.5 hours at 25° C. to a stirred mixture of heptanetrione-2,4,6 (7.1 g.), toluene (30 ml.) and a solution of 4% by weight of trimethylamine in toluene (8 ml.). After completion of the addition the reaction mixture was stirred for another 4 hours and then it was cooled to 5° C. and filtered to give 2.5 g. of a solid, M.P. 170–177° C. The solid was suspended in 50 ml. of methanol, heated to boiling and filtered hot. The insoluble material obtained weighed 1.5 g. (11%), M.P. 197–199.5° C. This solid was identified as compound B by mixed melting with a pure sample of compound B, 3,6-diacetyl-4,7-dimethyl-5-hydroxycoumarin.

The methanol filtrate, on cooling, gave 0.5 g. of impure compound C, 3,8-diacetyl-4,7-dimethyl-5-hydroxycoumarin, M.P. 250–255° C. A mixed melting point with a pure sample of compound C showed no depression. Concentration of the methanol filtrate afforded an additional 0.4 g. of compound C of poorer quality, M.P. 235–245° C. The total yield of compound C was 6%. The process is equally operable with other tertiary amines as the catalyst.

Compounds B and C can also be produced by the reaction of diketene and 2,4-diacetylorcinol in the presence of a tertiary amine, as shown in the following example. 2,4-diacetylorcinol (1 g.) was dissolved in toluene (15 ml.) together with about 0.3 g. of a 4% solution of trimethylamine in toluene. Diketene (0.55 g.) was added dropwise over a 20-minute period at 25° C. The mixture was stirred for 3 hours and filtered. The solid obtained was 0.7 g., M.P. 180–230° C. This solid was extracted with boiling chloroform (20 ml.) to give 0.07 g. (5.3% yield) of compound B, M.P. 197–199° C. A mixed melting point with a pure sample of compound B showed no depression. Concentration of the chloroform gave some additional compound B. The insoluble solid after chloroform extraction was found to be compound C by mixed melting with a known sample of compound C; the weight was 0.10 g. (7.6%), M.P. 258–260° C. In this process some dehydroacetic acid was also found in the original toluene liquor. The process is equally applicable using other tertiary amines as the catalyst.

Compound A was also produced by the reaction of diketene and compound B, as follows. A mixture of compound B (1.50 g.), benzene (22 ml.) and triethylamine (0.3 g.) was refluxed while diketene (4.5 g.) was added dropwise over a period of 20–25 minutes. After addition was complete the reaction mixture was refluxed for another 4 hours. After cooling to room temperature the insoluble solid was filtered off, weighing 2.0 g., M.P. 227–230° C. This solid was then suspended in methanol and heated to boiling and filtered hot. The insoluble solid left behind was 1.90 g., M.P. 234–236° C. A mixture of this compound with a known sample of compound A showed no depression in melting point. Evaporation of the original benzene filtrate gave 2.6 g. of impure dehydroacetic acid as by-product, M.P. 102–108° C. The process is equally applicable using other tertiary amines as the catalyst.

It was found that 3,8-diacetyl-4,7-dimethyl-5-hydroxycoumarin, compound C, could be partially isomerized to 3,6-diacetyl-4,7-dimethyl-5-hydroxycoumarin, compound B, by heating for about 20 minutes at about 50° C. in 5 percent methanolic potassium hydroxide or by heating for about two hours at about 140° C. with aluminum chloride. Likewise, compound B could be isomerized to compound C in methanolic potassium hydroxide.

What is claimed is:

1. A process for the production of coumarin compounds selected from the group consisting of 3,6-diacetyl-4,7-dimethyl-5-hydroxycoumarin, 3,8-diacetyl-4,7-dimethyl-5-hydroxycoumarin and 3,9-diacetyl-4,5,10-trimethyl-2H, 8H-benzo[1,2-b:3,4-b']dipyran-2,8-dione, which comprises reacting diketene in a tertiary amine medium wherein said tertiary amine is aliphatic in nature and is present in at least 15 percent by weight and recovering said coumarin compounds from the reaction mixture thereof.

2. A process as claimed in claim 1 wherein the tertiary amine medium is free of inert solvent.

3. A process as claimed in claim 1 wherein the tertiary amine medium contains an inert solvent and wherein the concentration of the tertiary amine in the medium represents at least about 20 percent by weight thereof.

4. A process as claimed in claim 1 wherein the tertiary amine is a tertiary alkylamine that is aliphatic in nature.

5. A catalytic process for producing a coumarin compound selected from the group consisting of 3,6-diacetyl-4,7-dimethyl-5-hydroxycoumarin and 3,8-diacetyl-4,7-dimethyl-5-hydroxycoumarin, which comprises reacting diketene and heptanetrione-2,4,6 in contact with a catalytic amount of a tertiary amine.

6. A catalytic process for producing a coumarin compound selected from the group consisting of 3,6-diacetyl-4,7-dimethyl-5-hydroxycoumarin and 3,8-diacetyl-4,7-dimethyl-5-hydroxycoumarin, which comprises reacting diketene and diacetylorcinol in contact with a catalytic amount of a tertiary amine.

7. A catalytic process for the production of 3,9-diacetyl-4,5,10- - trimethyl - 2H,8H - benzo[1,2-b:3,4-b']dipyran-2,8-dione, which comprises reacting 3,6-diacetyl-4,7-dimethyl-5-hydroxycoumarin and diketene in contact with a catalytic amount of a tertiary amine.

References Cited

Sethna et al.: Chem. Reviews, vol. 36 (1945), page 19.

JAMES A. PATTEN, *Primary Examiner.*

U.S. Cl. X.R.

252—408

PO-1050
(5/69)

UNITED STATES PATENT OFFICE
CERTIFICATE OF CORRECTION

Patent No. 3,449,372.　　　　　　　　　Dated　June 10, 1969

Inventor(s)　E. Marcus et al.

It is certified that error appears in the above-identified patent and that said Letters Patent are hereby corrected as shown below:

Column 2, line 32; the term in the equation set forth as "$CH_2$" should be -- $CO_2$ --.

SIGNED AND
SEALED

SEP 2 - 1969

(SEAL)
Attest:

Edward M. Fletcher, Jr.
Attesting Officer

WILLIAM E. SCHUYLER, JR.
Commissioner of Patents